United States Patent [19]
Helling

[11] Patent Number: 5,468,431
[45] Date of Patent: Nov. 21, 1995

[54] METHOD FOR PREPARING MOLDABLE MIXTURES OF INCOMPATIBLE PLASTICS

[75] Inventor: Wilhelm Helling, Schluchtweg 25, 4517 Hilter, Germany

[73] Assignee: Wilhelm Helling, Hilter, Germany

[21] Appl. No.: 908,294

[22] Filed: Jul. 2, 1992

[30] Foreign Application Priority Data

Jul. 5, 1991 [DE] Germany .......... 41 22 382.0

[51] Int. Cl.⁶ .......... C08J 11/04
[52] U.S. Cl. .......... 264/37; 264/109; 264/122; 264/DIG. 69; 209/163
[58] Field of Search .......... 264/DIG. 69, 37, 264/109, 122; 209/10, 162, 163, 164, 166

[56] References Cited

U.S. PATENT DOCUMENTS

| | | | |
|---|---|---|---|
| 3,925,200 | 12/1975 | Izumi et al. | 209/9 |
| 4,098,649 | 7/1978 | Redker | 264/DIG. 69 |
| 4,119,533 | 10/1978 | Saitoh et al. | 209/162 |
| 4,338,274 | 7/1982 | Hill | 264/171 |
| 4,578,184 | 3/1986 | Rasmussen | 209/3 |
| 4,809,854 | 3/1989 | Tomaszek | 209/10 |
| 4,849,116 | 7/1989 | Weinmann et al. | 209/10 |
| 5,084,135 | 1/1992 | Brooks et al. | 209/10 |
| 5,120,768 | 6/1992 | Sisson | 209/166 |
| 5,126,058 | 6/1992 | Beckman | 210/703 |
| 5,169,588 | 12/1992 | Estepp | 264/122 |
| 5,199,652 | 4/1993 | Mikofalvy et al. | 209/4 |
| 5,234,110 | 8/1993 | Kobler | 209/166 |
| 5,268,074 | 12/1993 | Brooks et al. | 209/10 |

FOREIGN PATENT DOCUMENTS

| | | | |
|---|---|---|---|
| 3239526 | 4/1984 | Germany | 264/37 |
| 3715646 | 11/1988 | Germany . | |
| 3919995 | 1/1991 | Germany . | |
| 4105285 | 8/1992 | Germany | 264/37 |
| 53-141376 | 12/1978 | Japan | 264/37 |
| 57-029424 | 2/1982 | Japan | 264/37 |
| 7810978 | 5/1980 | Netherlands | 264/37 |

OTHER PUBLICATIONS

"Formteilherstellung aus Kunststoffabfall", *Kunststoffe*, vol. 74, No. 8, 1984, p. 433.

Primary Examiner—Allan R. Kuhns
Attorney, Agent, or Firm—Hill, Steadman, Simpson

[57] ABSTRACT

A method for preparing a mixture of plastics that are incompatible in view of processing in a shaping process, such as by extrusion, characterized by providing an initial mixture of a first part which is essentially composed of uniform material in view of a group of chemical substances, and a second part, separating the first part from the second part, processing the second part to enlarge or modify the surfaces of the constituents of the second part, then recombining the first and second parts into a final mixture, with the second part being essentially uniformly distributed in the first part of the mixture so that an essentially uniform product will occur when processing the mixture in a shaping process. The invention is also directed to a mixture manufactured by this method.

5 Claims, 1 Drawing Sheet

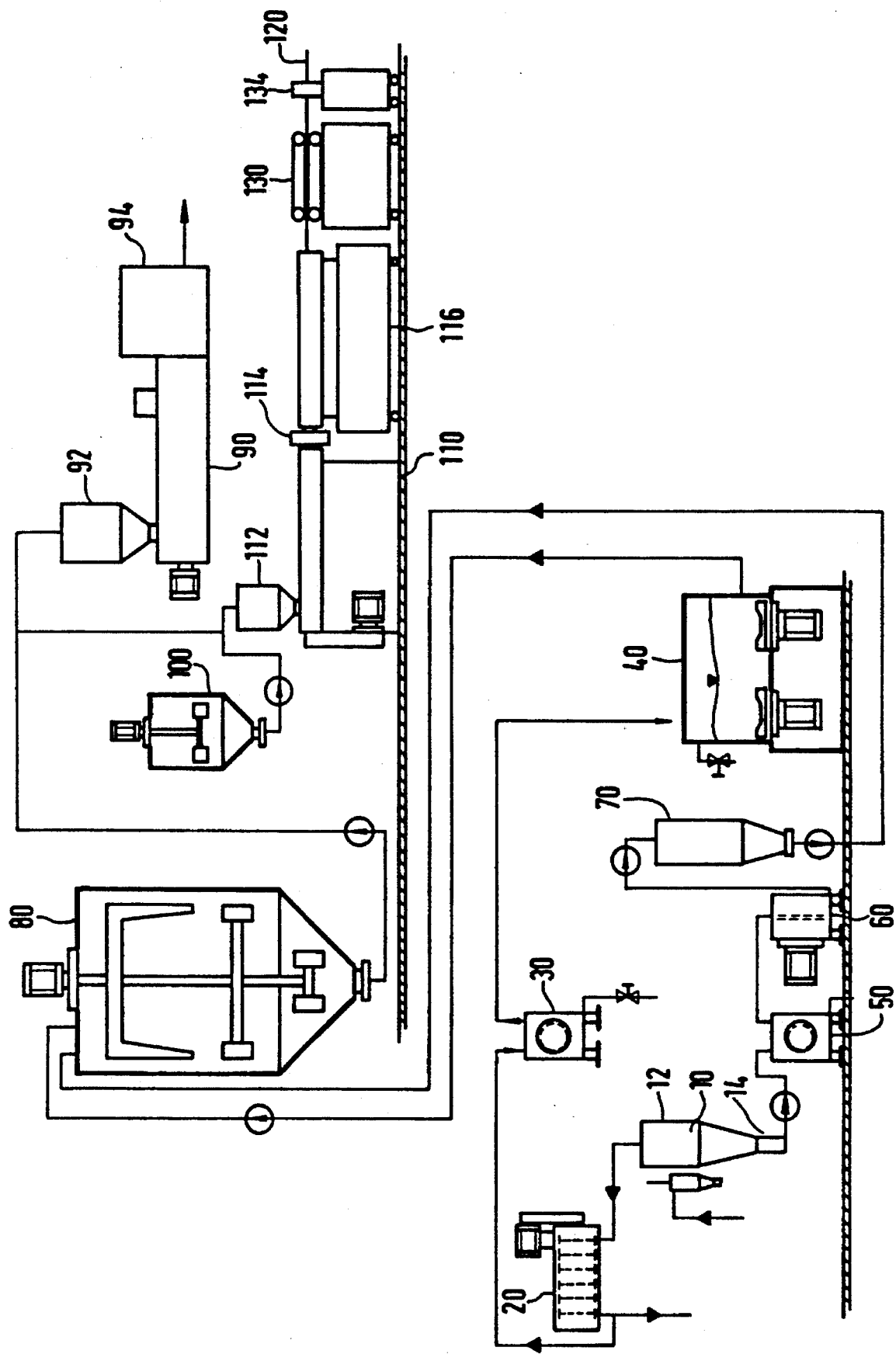

METHOD FOR PREPARING MOLDABLE MIXTURES OF INCOMPATIBLE PLASTICS

BACKGROUND OF THE INVENTION

The present invention is directed to a method for preparing a mixture of plastics that are incompatible in view of a further processing in a shaping process, such as, for example, by extrusion or the like. The invention is also directed to a mixture which is producible in accordance with the method, as well as the use of the mixture.

Mixtures of plastics, that are incompatible in view of a further-processing in shaping processes, such as, for example, an extrusion, have heretofore led to products that can only satisfy low physical and mechanical demands. These mixtures were, therefore, employed only in the area wherein no high-quality demands were raised. In view of the constantly increasing significance of recycling of plastics from household and industrial waste, it would be desirable to be able to use a mixture of incompatible plastics which could be used in products other than those requiring low physical and mechanical properties.

SUMMARY OF THE INVENTION

The object of the present invention is to provide a method in which the preparation of a plastic mixture of plastic constituents, that were heretofore not recyclable together or could only be further processed together into products of low quality, can now be capable of being further processed into products that will meet high physical and mechanical demands.

To accomplish these objects, the invention is directed to a method for preparing a mixture of plastics that are incompatible in view of a processing in shaping processes, which method includes the steps of removing or separating a first part of the mixture, which first part is essentially composed of uniform material in view of the chemical group of materials from a starting material, a second part of this starting material is then subjected to a surface processing which is selected from a group consisting of surface enlarging, surface modifying and surface enlarging with surface modification, then recombining the first part that was removed and the second part which was further processed back together and processing this mixture of the combined first and second parts, wherein the second part of the mixture is essentially uniformly distributed in the first part of the mixture so that an essentially uniform product will occur when processing the mixture in a shaping process.

It is also inventively proposed that the separation of the first part of the mixture occurs at least partially in a hydrocyclone and/or at least partially in an apparatus that works according to the sink-or-swim principle having a variable density of the carrier liquid.

It can thereby be provided that the first, separated part of the mixture is subjected to an intermediate treatment in an agglomerator for conditioning the surface and/or for removing residual moisture.

A particular embodiment of the invention provides that the second part of the mixture is composed of the entire remainder of the original starting batch after the separation of the first part therefrom. It is also inventively provided that the second part of the mixture is ground into a grinding stock having a grain size in a range of 10 μm to 100 μm. Preferably, this grain size is in a range of 30 μm to 50 μm.

It can thereby be provided that the constituents of the second part of the mixture are coated with a coating.

In a preferred embodiment of the invention, the substance or composition of substances is added that upon further processing of the mixture will effect a physical and/or chemical linking of the intrinsically incompatible plastics constituents. Namely, the substance is an amount in a range of 2% to 20% by weight with reference to the total quantity of the mixture being produced. It is thereby preferably provided in the invention that this substance or this composition of substances is selected from a group of substances that are in the position to enter into bonds with the prepared plastics materials via reactable end groups. It is also inventively proposed that a block copolymer is used, and this block copolymer is selected from a group consisting of materials with a structure of polystyrol/polybutadiene/polystyrol and materials with a structure of polystyrol/polyisoprene/polystyrol. The block polymer is utilized in an amount of approximately 2% to 15% by weight and, preferably, 5% by weight with reference to the total quantity of the mixture.

Another embodiment of the invention proposes that a substance or a composition of substances is added that, upon further processing of the mixture, will effect a surface conditioning in view of the adhesive behavior and/or application of the coatings, such as paint or lacquer. Namely, this substance is present in an amount in a range of 2% to 10% by weight with reference to the total quantity of the mixture.

It is, therefore, preferably provided that the substance or composition of substances has reactable end groups or is able to form them.

It is thereby preferably proposed that a block copolymer having the structure polydimethylsiloxane having hydrated butadienstyrol blocks is utilized in an amount in a range of approximately 2% to 10% by weight.

Fillers and other strength carriers can be added in specific embodiments of the invention. A mixture of waste paper, steel wool, fiberglass and aramid in a defined mixing ration, preferably in a weight ratio of 18:50:32:2 is thereby preferably employed as the strength carrier.

It is provided in another embodiment of the invention that the additional plastic material is added in order to achieve a defined mixing ratio of the plastics in the prepared mixture.

The invention is also directed to a mixture producible with the method of the invention, which mixture comprises a first part that is composed of an essentially uniform material in view of the group of chemical substances, and is composed of a second part that has been subjected to a processing for changing the surface, such as either enlarging the surface and/or modifying the surface, before being blended with the first part and that it is essentially uniformly distributed in the first part.

The contents of the substance or composition of the substances that effects a physical and/or chemical linking of the inherently incompatible plastic constituents in the mixture when further processing the mixture in the amount of a range between 2% to 20% by weight with reference to the total quantity of the mixture is thereby preferred.

The content of approximately 2% to 15% by weight, preferably 5% by weight, with reference to the total quantity of the mixture of the substance or the composition of substances from a group of substances that are in the position to enter into bonds with the prepared plastic materials via reactable end groups, particularly the content of a block copolymer selected from a group having the structure polystyrol/polybutadiene/polystyrol and a structure of polystyrol/polyisoprene/polystyrol, is thereby especially advantageous.

In a further embodiment of the mixture of the invention, a substance or a composition of substances is contained therein that effects a surface conditioning during further processing of the mixture, in view of the adhesive behavior and/or application of coatings, such as paint or lacquer layers. This further step is being contained therein in a quantity in a range of between 2% and 10% by weight with reference to the total mixture.

In another embodiment of the mixture of the invention, a content of fillers and/or strength carrier is provided, whereby the mixture of waste paper, steel wool, glass fibers and aramid in a defined mixing ration, preferably with the weight ratio of 18:50:30:2, is utilized as a strength carrier.

A content of additional plastic material that is added in such a quantity that a predetermined mixing ratio of the plastic is present can be advantageous.

Finally, the invention is also directed to the employment of a mixture of the invention for manufacturing pellets or as a charging material, which may be in the form of pellets as well, for extrusion, injection molding, compression molding and blowing processes.

The method of the invention has made it possible for the first time to successfully refine and/or upgrade the mixtures of plastics that are extremely heterogenous, in view of the types of plastic represented therein, that can be separated from household or industrial waste in such a way that they meet a profile demand that would heretofore be achieved only with new or raw materials. It is, therefore, also a particular advantage that the addition of the specific substances or compositions of substances additionally makes it possible to designationally set the physical and/or mechanical properties or, respectively, the surface workability of the products manufactured from the mixture of the invention to a specific profile of demands.

A critical perception of the invention comprises that it is usually not adequate for manufacturing a mixture for further processing to grind all of the plastic material into a powder in order to thereby achieve an optimally uniform mixture, since the physical and/or chemical structure of the constituents can be so greatly damaged by this unspecified comminution of the material that the product manufacturable from the mixture can no longer meet the desired profiles or demands. It has now been surprisingly shown that a prepared plastics mixture that can, in fact, be meaningfully utilized in a recycling process can only be produced when the part composed of plastics that are essentially uniform, in view of the group of chemical substances, is separated in a first step and is later employed as a type of matrix material, wherein it is adequate for achieving a uniform, equal distribution in the mixture to finally comminute a further or, respectively, remaining part of the initial mixture or to modify the remaining part by applying a coating to the surface and to subsequently re-introduce it into the matrix material as a type of filler.

Especially good results are achieved when what are referred to as "compatibilizers" are added to the mixture, for example substances that render basically incompatible plastics compatible by bonding via reactable end groups, for example, directly or indirectly link them to one another in a further processing in a shaping process, such as, for example, extrusion, in order to, thus, proceed to an inherently largely uniform final product. The selection of these compatibilizers, as well as the quantity of these substances or compositions of substances to be added, makes it possible to intentionally control the physical and/or mechanical properties of the final product to be manufactured from the corresponding mixture, for example, to produce products having a defined resistance to tearing, extension by breaking, surface reactivity, etc.

When the first part of the plastic mixture to be prepared, which is initially separated, is essentially composed of polyolefines, this should be melted in an agglomerator and shaped into small balls before being recombined with the remaining part of the mixture that has been further processed in the meantime. For example, such further processing being by grinding and/or coating, in order to thereby improve the mixing behavior in the next following step.

Further features and advantages of the invention will be readily apparent from the following exemplary embodiment of the invention set forth hereinbelow, the drawings and claims.

BRIEF DESCRIPTION OF THE FIGURE

The single FIGURE is a diagrammatic flow sheet of the method that is particularly preferred within the framework of the present invention and includes exemplary possibilities for further processing the plastics mixture produced thereby.

DESCRIPTION OF THE PREFERRED EMBODIMENTS

The principles of the present invention are particularly useful for processing an initial material obtained from household and/or commercial waste.

The mixture obtained from the household and/or commercial waste is utilized as an example of an initial mixture for the processing method of the invention. The raw recyclable that is separated from other wastes, such as glass, metal, combustibles, etc., in a first step of a manual separation is thereby first compressed in a baling press, it is then pre-comminuted, cleaned of metal constituents in a metal detector and is largely freed of dirt particles via either a pre-washer, a mill for wet grinding, a friction washer or a turbo washer. It should, again, be pointed out that at this point, it is not only cleaned plastics mixtures of household and commercial waste that, of course, can be employed in the method of the invention, but that specifically compiled plastics mixtures of new materials can also be employed therein.

In a first step of the method illustrated in the Figure, the clean plastic mixture is, first, separated into two fractions or parts in a hydrocyclone 10. The separation thereby occurs via the differences in the density of the individual plastics. When the initial material, as is definitely typical for plastic mixtures recovered from wastes, is composed of approximately 60% to 80% polyolefines, with approximately 10% polypropylene and the remainder polyethylene; 10% to 20% polystyrol; 5% to 10% PVC and the rest of other plastics, the polyolefines can be withdrawn from an overflow portion 12 of the hydrocyclone 10 as a result of their lower density ($\rho<1$), whereas the remaining plastics $\rho>1$) will settle in the hydrocyclone and are downwardly withdrawn from the underflow or lower end 14. As an alternative to, or in addition to, the separation of plastics in the hydrocyclone, the separation of the first part of the mixture can also occur in an apparatus that works according to a sink-or-swim principle having a variable density for the carrier liquid.

The polyolefine/water mixture from the hydrocyclone 10 is forwarded to a strainer 20, wherein the water is separated and is preferably returned into the circulation. The product withdrawn from the strainer 20 is nearly 99.99% polyolefines in the present example.

These materials from the strainer are then dried in a mechanical dryer 30 and are subsequently supplied to an agglomerator 40 wherein the polyolefine pieces composed largely of planar pieces are melted and shaped into small balls in order to guarantee better mixability in the later stages of the method. At this point, strength carrier can also be preferably be added, since residual moisture potentially present can be simultaneously withdrawn from these substances in the agglomerator 40.

The second fraction or part of the initial mixture that was downwardly withdrawn from the bottom portion or underflow 14 of the hydrocyclone 10 is, likewise, dried in a mechanical dryer 50 and is then subsequently supplied to a pulverization mill 60, wherein the material is ground to a grain size in a range of approximately 30 μm to 80 μm. As an alternative thereto, or as a supplement thereto, a surface coat that influences the compatibility can also be applied. From the pulverizing mill 60, the ground and potentially coated product is then transferred to an intermediate silo 70. This ground and potentially coated product is then recombined with the agglomerated polyolefine fraction in a mixing silo 80, wherein an intimate blending will occur. The plastics mixture of the invention can then be withdrawn from the mixing silo 80 and can, for example, be subjected to the following two further processing processes. First, it is possible to introduce this mixture into a funnel 92 for a compounder 90, wherein it is mixed with a strength carrier, such as, for example, waste paper, steel wool, glass fibers, aramid or the like or mixtures thereof (if this has not already occurred in the agglomerator 40), it can also be blended with a suitable compatibilizer and to process it into recyclable pellets in the following granulator 94.

Another possibility is a direct further processing of the plastic mixture of the invention into a finished product. To accomplish this, the mixture of the invention is, first, supplied to an additional or further mixer 100 and, in the exemplary case being set forth, is mixed with suitable strength carriers, as recited above, and with a suitable compatibilizer, such as, for example, a block copolymer having the structure polystyrol/polybutadiene/polystyrol in the quantity of approximately 5% by weight and, potentially, with a substance for surface conditioning of the finished product, such as, for example, a block copolymer having the structure of polydimethylsiloxane with hydrated butadienstyrol blocks in a quantity of, likewise, approximately 5% by weight.

This mixture is then supplied via a funnel 112 to an extruder 110, wherein the mixture will be melted. The extruder 110 has a nozzle head 114 for shaping the extruded material, which then may be calibrated and cooled in a calibration and cooling unit 116, which immediately follows the head 114. Plastic profiles, such as 120 shown in the illustrated example, can be taken from the apparatus via a haul-off means 130, and are supplied to a saw or cutting device 134 in which they are cut to appropriate piece lengths.

Alternatively thereto, the mixture from the mixer 100, however, can also be supplied to the compounder 90 with following granulator 94 and can be further processed therein to form recyclable pellets.

In the direct processing via an extruder, for example, profiles can be produced from the preferred plastic mixture that, first, have excellent physical and mechanical properties, such as a high bending strength, excellent temperature behavior, etc. Due to the addition of the block copolymers, the products can have a preconditioned surface to which all types of coatings, paints and lacquers usually will adhere. The cut surface of these profiles visually appear extremely uniform, as has heretofore only been for corresponding products produced of new material. A corresponding further processing of the plastic mixture without the preparation of the invention inserted thereinto, by contrast, leads to completely unsatisfactory results.

The features of the invention disclosed in the above specification, as well as in the claims and the attached drawing can be critical for the realization of various embodiments of the invention in both individual and arbitrary combinations.

I claim:

1. A method for preparing a mixture of plastics that are incompatible for processing in shaping processes, said method comprising the steps of providing the mixture of plastics as an initial starting material having a first part, which is composed essentially of uniform material of a chemical group of substances, and a second part; separating the first part of the initial starting material from the second part; subjecting the second part to a surface processing of the constituents to form a processed second part, said surface processing being selected from a group of processes consisting of surface enlarging, surface modifying and surface enlarging with surface modification; subsequently recombining the first separated part and the processed second part to form a new mixture, wherein the second part of the new mixture is essentially uniformly distributed in the first part of the new mixture, and adding a substance during a further processing of the new mixture to cause a physical and chemical linking of inherently incompatible plastics constituents in the new mixture, said substance being added in a range of 2% to 20% by weight with reference to the total quantity of the new mixture, so that when the new mixture is processed in a subsequent shaping process, a uniform product is produced.

2. A method according to claim 1, wherein said substance is selected from a group of substances that are in a position to enter into bonds with the prepared plastics material via reactable end groups.

3. A method according to claim 2, said substance is a block copolymer selected from the group consisting of materials having a structure of polystyrol/polybutadiene/polystyrol and materials having a structure of polystyrol/polyisoprene/polystyrol, said block copolymer being added in an amount of approximately 2% to 15% by weight with reference to the total quantity of the new mixture.

4. A method according to claim 3, wherein the block copolymer is added as 5% by weight with reference to the total quantity of the new mixture.

5. A method for preparing a mixture of plastics that are incompatible for processing in shaping processes, said method comprising the steps of providing the mixture of plastics as an initial starting material having a first part, which is composed essentially of uniform material of a chemical group of substances, and a second part; separating the first part of the initial starting material from the second part; subjecting the second part to a surface processing of the constituents to form a processed second part, said surface processing being selected from a group of processes consisting of surface enlarging, surface modifying and surface enlarging with surface modification; and subsequently recombining the first separated part and the processed second part to form a new mixture; and adding fillers and strength members to the new mixture, the strength members being a mixture of waste paper, steel wool, glass fibers and aramid in a defined mixing weight ratio of 18:50:30:2, wherein the second part of the new mixture is essentially uniformly distributed in the first part of the new mixture so that when the new mixture is processed in a subsequent shading process, a uniform product is produced.

* * * * *